(12) United States Patent
Kobayashi et al.

(10) Patent No.: US 12,155,277 B2
(45) Date of Patent: Nov. 26, 2024

(54) DRIVING UNIT AND VEHICLE

(71) Applicants: HONDA MOTOR CO., LTD., Tokyo (JP); HITACHI ASTEMO, LTD., Ibaraki (JP)

(72) Inventors: Heisuke Kobayashi, Saitama (JP); Takeshi Hoshinoya, Saitama (JP); Keiichiro Kashiwabara, Saitama (JP); Norifumi Yasuda, Saitama (JP); Manabu Yazaki, Saitama (JP); Tomoyuki Suzuki, Saitama (JP); Akira Fujiwara, Ibaraki (JP); Hideaki Noto, Ibaraki (JP); Shunsuke Isogai, Ibaraki (JP); Yu Asakura, Ibaraki (JP)

(73) Assignees: HONDA MOTOR CO., LTD., Tokyo (JP); HITACHI ASTEMO, LTD., Ibaraki (JP)

( * ) Notice: Subject to any disclaimer, the term of this patent is extended or adjusted under 35 U.S.C. 154(b) by 427 days.

(21) Appl. No.: 17/624,130

(22) PCT Filed: Jun. 29, 2020

(86) PCT No.: PCT/JP2020/025544
§ 371 (c)(1),
(2) Date: Dec. 30, 2021

(87) PCT Pub. No.: WO2021/002330
PCT Pub. Date: Jan. 7, 2021

(65) Prior Publication Data
US 2022/0263389 A1 Aug. 18, 2022

(30) Foreign Application Priority Data
Jul. 2, 2019 (JP) .................................. 2019-123964

(51) Int. Cl.
*H02K 5/20* (2006.01)
*H02K 5/22* (2006.01)
(Continued)

(52) U.S. Cl.
CPC ............. *H02K 11/33* (2016.01); *H02K 5/203* (2021.01); *H02K 5/225* (2013.01); *H02K 9/19* (2013.01)

(58) Field of Classification Search
CPC ........ H02K 7/116; H02K 7/006; H02K 7/083; H02K 11/33; H02K 11/40; H02K 11/215;
(Continued)

(56) References Cited

U.S. PATENT DOCUMENTS 8,643,235 B2 2/2014 Omiya et al.
9,768,672 B2 9/2017 Mohr
(Continued)

FOREIGN PATENT DOCUMENTS

CN 101678755 A 3/2010
CN 102868258 A 1/2013
(Continued)

OTHER PUBLICATIONS

Sep. 24, 2020, International Search Report issued for related PCT Application No. PCT/JP2020/025544.
(Continued)

*Primary Examiner* — Bryan R Perez
(74) *Attorney, Agent, or Firm* — Paratus Law Group, PLLC (57) ABSTRACT

A driving unit includes a rotary electric machine which has a rotation axis extending in a horizontal direction, a rotary electric machine case, and an electric power conversion device. The electric power conversion device is disposed on one side of the rotary electric machine in an orthogonal direction. A first coolant is stored in a rotary electric machine (Continued)

accommodating portion of the rotary electric machine case. The driving unit has a first connecting portion electrically connecting the rotary electric machine and the electric power conversion device and a second connecting portion electrically connecting a sensor provided to the rotary electric machine and the electric power conversion device. The first connecting portion and the second connecting portion are disposed between the rotary electric machine and the electric power conversion device in the orthogonal direction.

13 Claims, 8 Drawing Sheets

(51) Int. Cl.
  *H02K 9/19* (2006.01)
  *H02K 11/33* (2016.01)
(58) Field of Classification Search
  CPC .......... H02K 5/203; H02K 5/20; H02K 5/225; H02K 5/161; H02K 9/19; H02K 9/193; H02K 9/22; H02K 9/223; H02K 9/227
  See application file for complete search history.

(56) References Cited

U.S. PATENT DOCUMENTS

| | | |
|---|---|---|
| 2009/0206709 A1 | 8/2009 | Kakuda et al. |
| 2010/0084206 A1 | 4/2010 | Yoshida et al. |
| 2013/0010426 A1 | 1/2013 | Nakano et al. |
| 2013/0049495 A1 | 2/2013 | Matsuo |
| 2015/0199376 A1 | 7/2015 | Matsuo |
| 2015/0333602 A1 | 11/2015 | Mohr |
| 2016/0126808 A1 | 5/2016 | Nagao et al. |
| 2016/0185232 A1* | 6/2016 | Suzuki .................. B60K 31/06 903/945 |
| 2018/0022202 A1 | 1/2018 | Urabe et al. |
| 2018/0026493 A1 | 1/2018 | Jung et al. |
| 2018/0262089 A1* | 9/2018 | Hatch .................. H02K 11/33 |
| 2019/0162181 A1 | 5/2019 | Yamaguchi et al. |
| 2019/0170140 A1 | 6/2019 | Yamaguchi |
| 2019/0173343 A1 | 6/2019 | Yamaguchi |
| 2019/0173344 A1 | 6/2019 | Ishikawa et al. |
| 2019/0173352 A1 | 6/2019 | Yamaguchi et al. |
| 2019/0173358 A1 | 6/2019 | Ishikawa et al. |
| 2019/0173359 A1 | 6/2019 | Ishikawa et al. |
| 2019/0178365 A1 | 6/2019 | Ishikawa et al. |
| 2019/0181720 A1 | 6/2019 | Yamaguchi et al. |
| 2019/0181723 A1 | 6/2019 | Yamaguchi |
| 2019/0181724 A1 | 6/2019 | Nakamatsu et al. |
| 2019/0186622 A1 | 6/2019 | Ishikawa et al. |
| 2019/0207478 A1 | 7/2019 | Yamaguchi et al. |
| 2019/0207479 A1 | 7/2019 | Yamaguchi et al. |
| 2019/0207480 A1 | 7/2019 | Yamaguchi |
| 2019/0207481 A1 | 7/2019 | Yamaguchi et al. |
| 2019/0219052 A1 | 7/2019 | Yamaguchi et al. |
| 2020/0007009 A1 | 1/2020 | Migita et al. |
| 2021/0083548 A1 | 3/2021 | Yamaguchi et al. |
| 2021/0288550 A1 | 9/2021 | Ishikawa et al. |
| 2023/0261542 A1 | 8/2023 | Yamaguchi et al. |

FOREIGN PATENT DOCUMENTS

| | | |
|---|---|---|
| CN | 105099084 A | 11/2015 |
| CN | 109478821 A | 3/2019 |
| CN | 109565226 A | 4/2019 |
| JP | 2007-166803 A | 6/2007 |
| JP | 2008-290621 A | 12/2008 |
| JP | 2009-201218 A | 9/2009 |
| JP | 2009-262858 A | 11/2009 |
| JP | 2011-182480 A | 9/2011 |
| JP | 2016-092931 A | 5/2016 |
| JP | 2016-167980 A | 9/2016 |
| JP | 2018-121432 A | 8/2018 |
| WO | WO 2016/121032 A1 | 8/2016 |

OTHER PUBLICATIONS

Sep. 24, 2020, International Search Opinion issued for related PCT Application No. PCT/JP2020/025544.
Jan. 9, 2024, Translation of Japanese Office Action issued for related JP Application No. 2021-530020.
May 23, 2023, European Communication issued for related EP Application No. 20834181.8.
Aug. 11, 2022, European Search Report issued for related EP Application No. 20834181.8.
Aug. 29, 2023, translation of Chinese Office Action issued for related CN Application No. 202080048376.3.

* cited by examiner

DRIVING UNIT AND VEHICLE

CROSS REFERENCE TO PRIOR APPLICATION

This application is a National Stage Patent Application of PCT International Patent Application No. PCT/JP2020/025544 (filed on Jun. 29, 2020) under 35 U.S.C. § 371, which claims priority to Japanese Patent Application No. 2019-123964 (filed on Jul. 2, 2019), which are all hereby incorporated by reference in their entirety.

TECHNICAL FIELD

The present invention relates to a driving unit equipped with an electric vehicle or the like and a vehicle equipped with a driving unit.

BACKGROUND ART

A vehicle such as hybrid and electric vehicles using a rotary electric machine as a driving source is known. The vehicle is equipped with the rotary electric machine and an electric power conversion device which is electrically connected to the rotary electric machine and converts the electric power supplied to the rotary electric machine and the electric power supplied from the rotary electric machine. In the related art, the rotary electric machine and the electric power conversion device are electrically connected by using a three-phase line. In recent years, however, attempts have been made to turn the rotary electric machine and the electric power conversion device into a unit by direct fixing.

For example. Patent Literature 1 proposes to directly fix an electric power conversion device as a driving unit above a rotary electric machine. However, in the configuration described in Patent Literature 1, an increase in the height dimension of the driving unit leads to a decline in the degree of freedom in terms of layout. Patent Literature 2 proposes to directly fix an electric power conversion device as a driving unit to one side of a rotary electric machine in an orthogonal direction orthogonal to both a rotation axis direction and an up-down direction.

CITATION LIST

Patent Literature

Patent Literature 1: WO-A-2016/121032
Patent Literature 2: US-A-2018/0262089

SUMMARY OF INVENTION

Technical Problem

However, when a vehicle is equipped with a large driving unit, the space of the passenger compartment or luggage compartment of the vehicle decreases, and thus the driving unit is required to be further reduced in size.

The present invention provides a driving unit which can be reduced in size and a vehicle equipped with a driving unit which can be reduced in size.

Solution to Problem

A first invention relates to a driving unit including:
a rotary electric machine which has a rotation axis extending in a horizontal direction;
a rotary electric machine case which has a rotary electric machine accommodating portion accommodating the rotary electric machine; and
an electric power conversion device which is electrically connected to the rotary electric machine and converts electric power supplied to the rotary electric machine and electric power supplied from the rotary electric machine, in which:
the electric power conversion device is disposed on one side of the rotary electric machine in an orthogonal direction orthogonal to both a rotation axis direction and an up-down direction;
a first connecting portion electrically connecting the rotary electric machine and the electric power conversion device is disposed below the rotation axis;
a second connecting portion electrically connecting a sensor provided to the rotary electric machine and the electric power conversion device is disposed above the rotation axis; and
the first connecting portion and the second connecting portion are disposed between the rotary electric machine and the electric power conversion device in the orthogonal direction when viewed from the rotation axis direction.

A second invention relates to a driving unit including:
a rotary electric machine which has a rotation axis extending in a horizontal direction;
a rotary electric machine case which has a rotary electric machine accommodating portion accommodating the rotary electric machine; and
an electric power conversion device which is electrically connected to the rotary electric machine and converts electric power supplied to the rotary electric machine and electric power supplied from the rotary electric machine, in which:
the electric power conversion device is disposed on one side of the rotary electric machine in an orthogonal direction orthogonal to both a rotation axis direction and an up-down direction;
a first coolant is stored in the rotary electric machine accommodating portion of the rotary electric machine case;
a coolant introduction pipe introducing a second coolant into the driving unit and a coolant discharge pipe discharging the second coolant from the driving unit are connected to the driving unit;
a first connecting portion electrically connecting the rotary electric machine and the electric power conversion device is disposed below the rotation axis on a first end portion side in the rotation axis direction, at least a part of the first connecting portion being immersed in the first coolant;
a coolant introduction pipe connecting portion where the coolant introduction pipe is connected and a coolant discharge pipe connecting portion where the coolant discharge pipe is connected are disposed below the rotation axis on a second end portion side in the rotation axis direction; and
the first connecting portion, the coolant introduction pipe connecting portion, and the coolant discharge pipe connecting portion are disposed between the rotary electric machine and the electric power conversion device in the orthogonal direction when viewed from the rotation axis direction.

Advantageous Effects of Invention

According to the first invention, the first connecting portion and the second connecting portion are disposed between the rotary electric machine and the electric power conversion device in the orthogonal direction when viewed from the rotation axis direction. As a result, the space between the rotary electric machine and the electric power conversion device can be effectively used and the driving unit can be reduced in size.

According to the second invention, the first connecting portion, the coolant introduction pipe connecting portion, and the coolant discharge pipe connecting portion are disposed between the rotary electric machine and the electric power conversion device in the orthogonal direction. As a result, the space between the rotary electric machine and the electric power conversion device can be effectively used and the driving unit can be reduced in size.

DESCRIPTION OF EMBODIMENTS

Hereinafter, a driving unit of one embodiment of the present invention and a vehicle of one embodiment equipped with the driving unit will be described with reference to the drawings. The front-rear, left-right, and up-down directions in the following description are directions seen from a vehicle operator. In the drawings, Fr is the front of the vehicle, Rr is the rear of the vehicle, L is the left side of the vehicle, R is the right side of the vehicle, U is the upper side of the vehicle, and D is the lower side of the vehicle.

[Vehicle]

Figure 1:
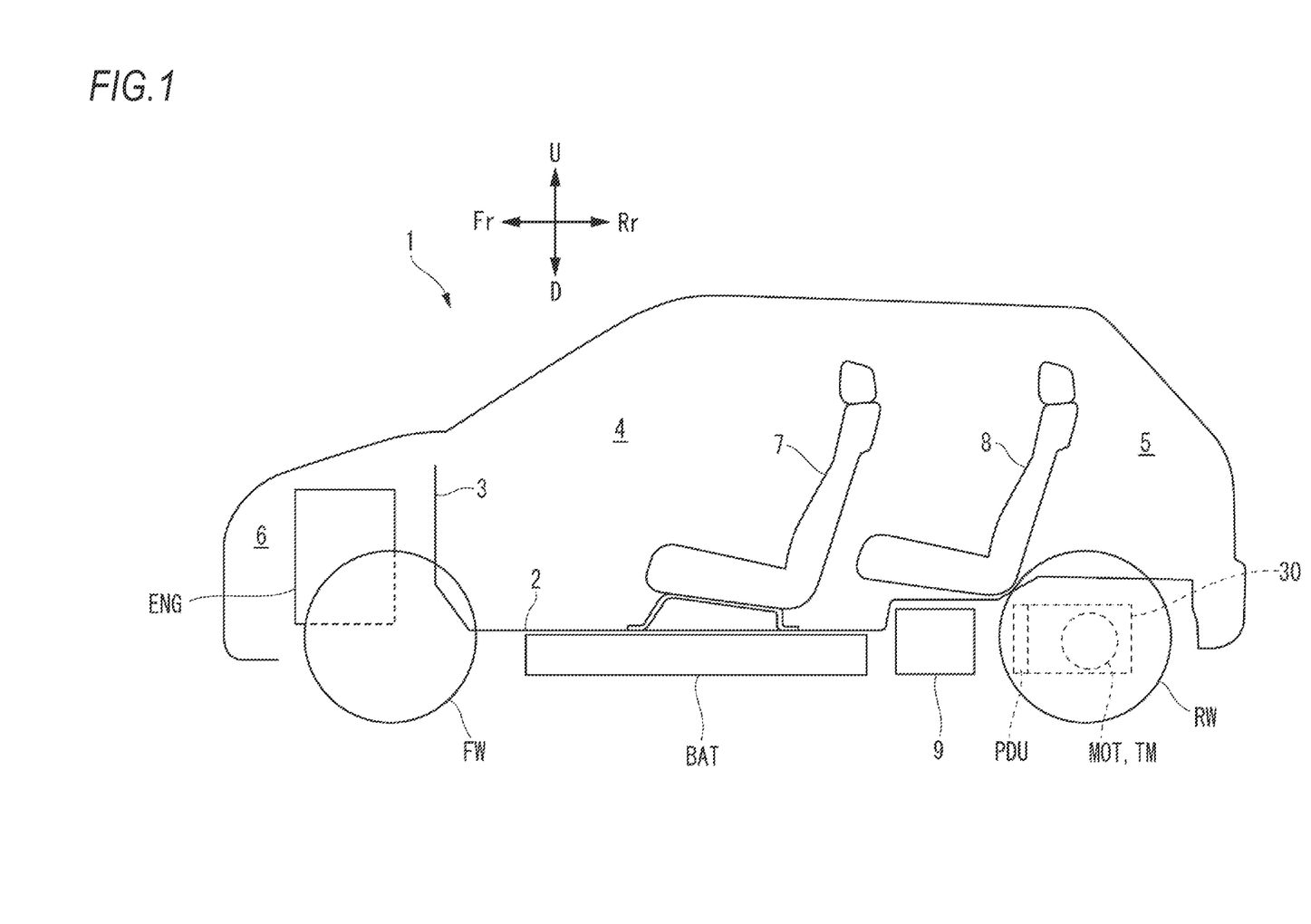
FIG. 1 is a schematic side view illustrating an overall structure of a vehicle capable of being equipped with the driving unit of an embodiment of the present invention.
Figure 2:
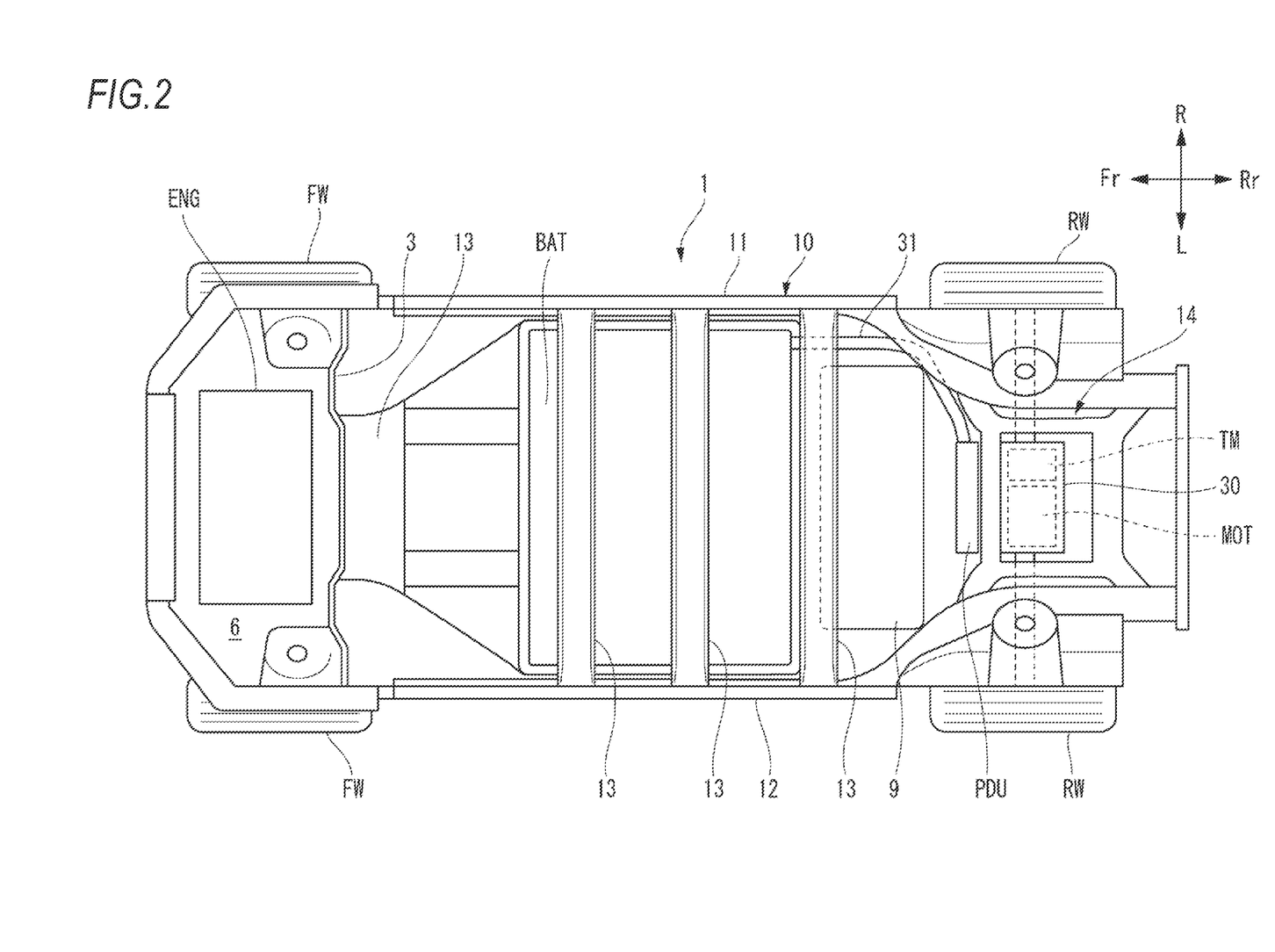
FIG. 2 is a plan view illustrating the underfloor structure of the vehicle of FIG. 1.

As illustrated in FIGS. 1 and 2, a vehicle 1 is divided into passenger compartment 4 and luggage compartment 5 and a front room 6 in front thereof by a floor panel 2 and a dash panel 3. The passenger compartment 4 is provided with a front seat 7 and a rear seat 8. The front room 6 is provided with an engine ENG as a driving source driving left and right front wheels FW. A driving unit 30 which accommodates an electric motor MOT as a driving source driving left and right rear wheels RW is provided below the luggage compartment 5. In other words, the vehicle 1 is a so-called hybrid vehicle using both the engine ENG and the electric motor MOT as driving sources.

A battery BAT and a fuel tank 9 are disposed below the passenger compartment 4. The battery BAT and the driving unit 30 are connected via a DC line 31. The engine ENG and the fuel tank 9 are connected via fuel piping (not illustrated).

A vehicle body frame 10 includes a pair of left and right side frames 11 and 12 extending in the front-rear direction, a plurality of cross members 13 extending in the vehicle width direction (hereinafter, also referred to as the left-right direction) and interconnecting the side frames 11 and 12, and a subframe 14 supporting the driving unit 30 and having a substantially rectangular shape in a plan view.

[Driving Unit]

Figure 3:
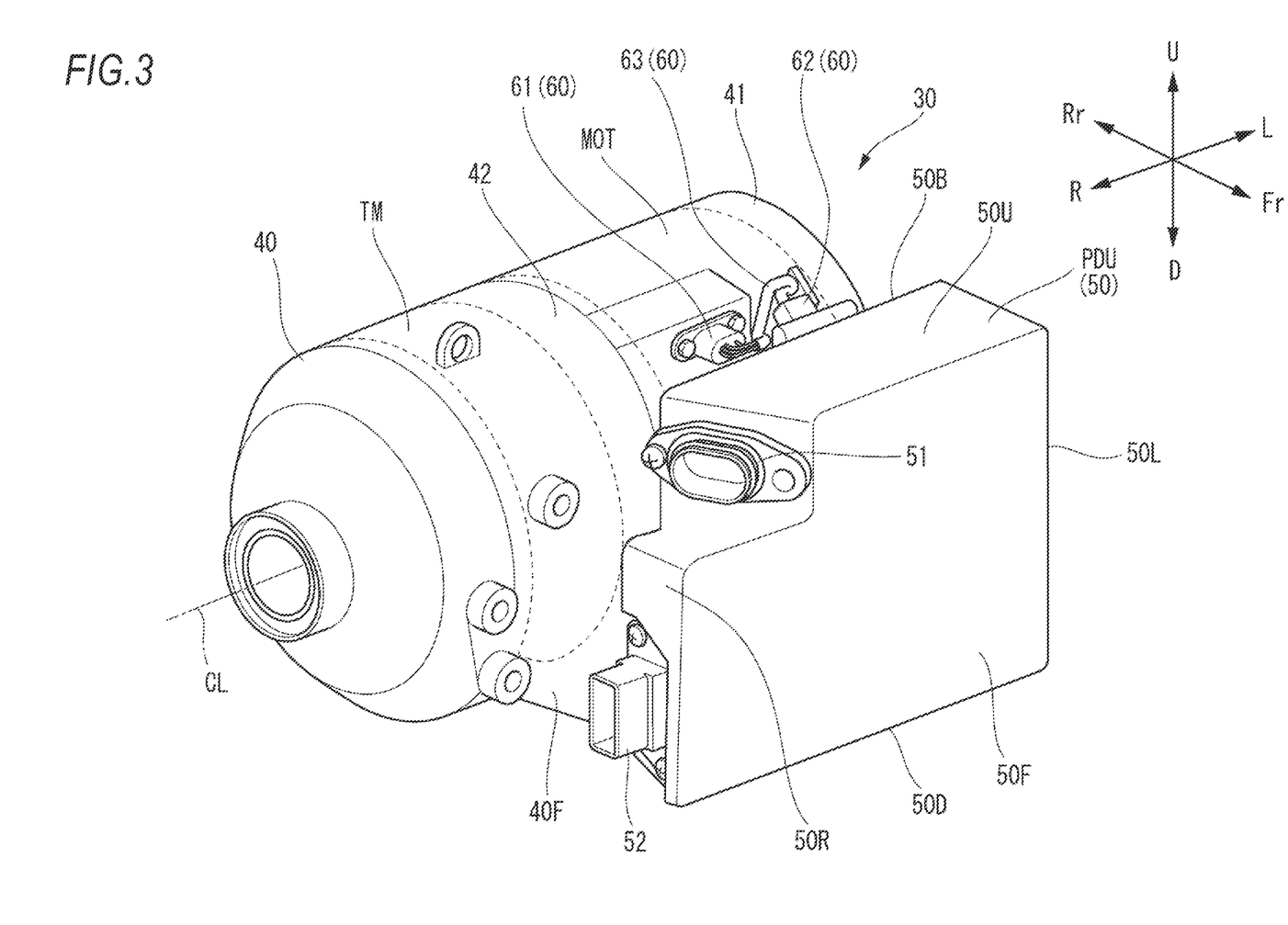
FIG. 3 is an overall perspective view of the driving unit of an embodiment of the present invention.

As illustrated in FIG. 3, the driving unit 30 includes the electric motor MOT, an electric power conversion device PDU which is electrically connected to the electric motor MOT and converts the electric power supplied to the electric motor MOT and the electric power supplied from the electric motor MOT, and a power transmission mechanism TM which transmits the power of the electric motor MOT to the rear wheel RW. The electric power conversion device PDU is, for example, an inverter.

The electric motor MOT has a substantially cylindrical shape, and a rotation axis CL extends substantially horizontally in the vehicle width direction. The rotation axis CL is the axial center of rotation of the electric motor MOT. The power transmission mechanism TM is disposed side by side in the vehicle width direction with the electric motor MOT such that the axial center of an output axis is coaxial with the rotation axis CL of the electric motor MOT. In the present embodiment, the electric motor MOT and the power transmission mechanism TM are disposed side by side such that the electric motor MOT is on the left side and the power transmission mechanism TM is on the right side in the vehicle width direction.

The electric motor MOT and the power transmission mechanism TM are accommodated in an electric motor case 40. The electric motor case 40 has an electric motor accommodating portion 41 and a power transmission mechanism accommodating portion 42. The electric motor MOT is accommodated in the electric motor accommodating portion 41, and the power transmission mechanism TM is accommodated in the power transmission mechanism accommodating portion 42.

The electric power conversion device PDU is disposed adjacent to the front of the electric motor MOT and the power transmission mechanism TM in the front-rear direction of the vehicle 1. The electric power conversion device PDU is positioned between the electric motor MOT and the power transmission mechanism TM and the passenger compartment 4 (see FIG. 1). In other words, in the present embodiment, the electric power conversion device PDU is positioned in front of the electric motor MOT and the power transmission mechanism TM. Accordingly, in the event of a rear collision of the vehicle 1, the impact is input to the electric motor MOT and the power transmission mechanism TM positioned behind the electric power conversion device PDU in the driving unit 30. As a result, it is possible to prevent the impact caused by the rear collision of the vehicle 1 from being directly input to the electric power conversion device PDU.

The electric power conversion device PDU has an electric power conversion device case 50. The electric power conversion device case 50 has a substantially rectangular parallelepiped shape and has a front surface 50F, a rear surface 50B, a left side surface 50L, a right side surface 50R, an upper surface 50U, and a lower surface 50D. The electric power conversion device case 50 is fixed to the electric motor case 40 such that the rear surface 50B of the electric power conversion device case 50 faces a front surface 40F of the electric motor case 40.

A DC connector 51 is provided on the upper side of the right side surface 50R of the electric power conversion device case 50, and a low-voltage connector 52 is provided on the lower side of the right side surface 50R of the electric power conversion device case 50.

The DC line 31 is connected to the DC connector 51 (see FIG. 8), and the electric power conversion device PDU and the battery BAT are electrically connected via the DC line 31.

A low-voltage line 32 is connected to the low-voltage connector 52 (see FIG. 8), and electric power for driving the electric power conversion device PDU is supplied to the electric power conversion device PDU. The low-voltage line 32 may be connected to the battery BAT or a low-voltage battery (not illustrated) provided separately from the battery BAT.

Figure 4:
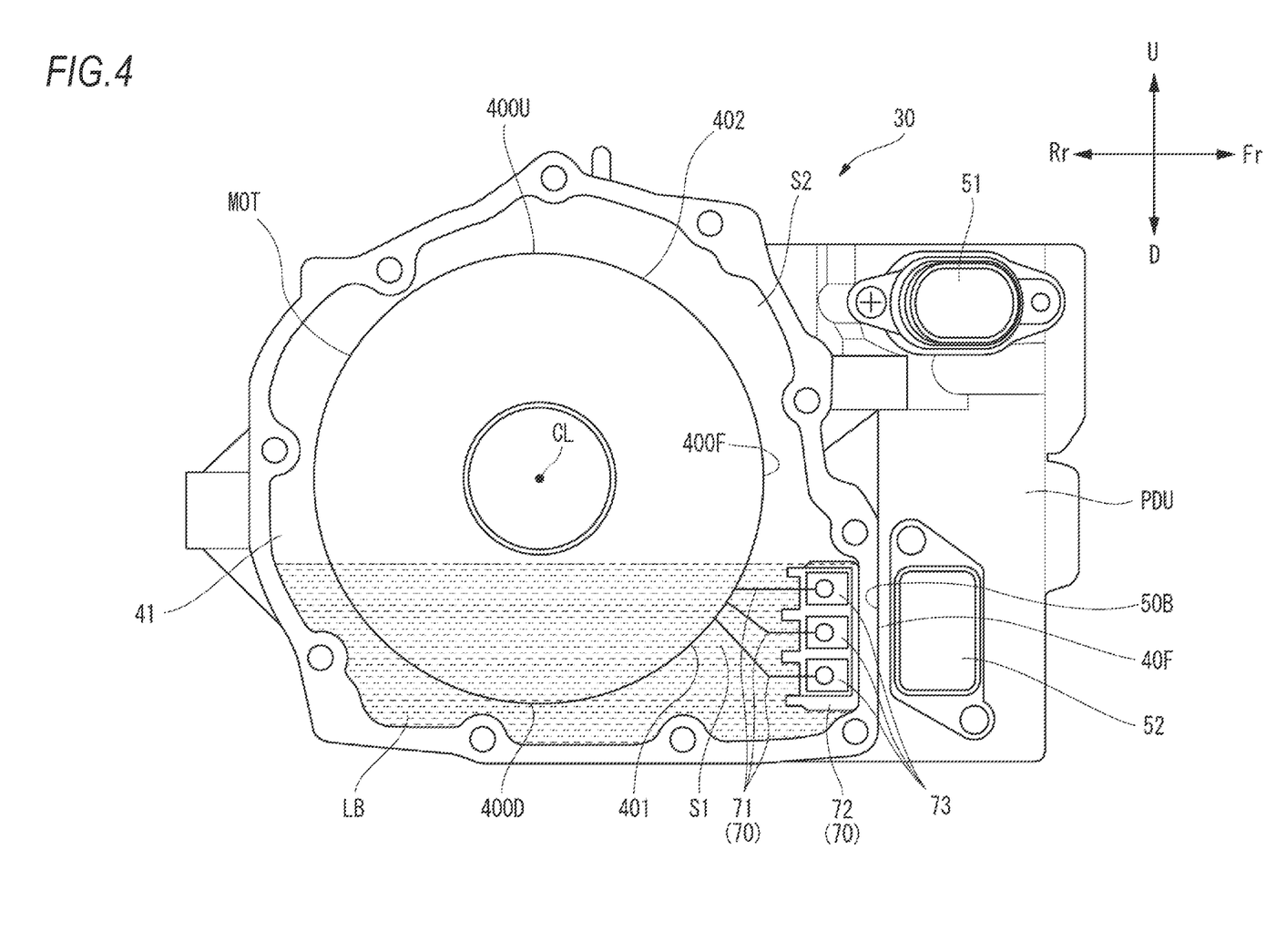
FIG. 4 is a view in which the electric motor accommodating portion and the electric power conversion device of the driving unit of FIG. 3 are viewed from the right side.
Figure 5:
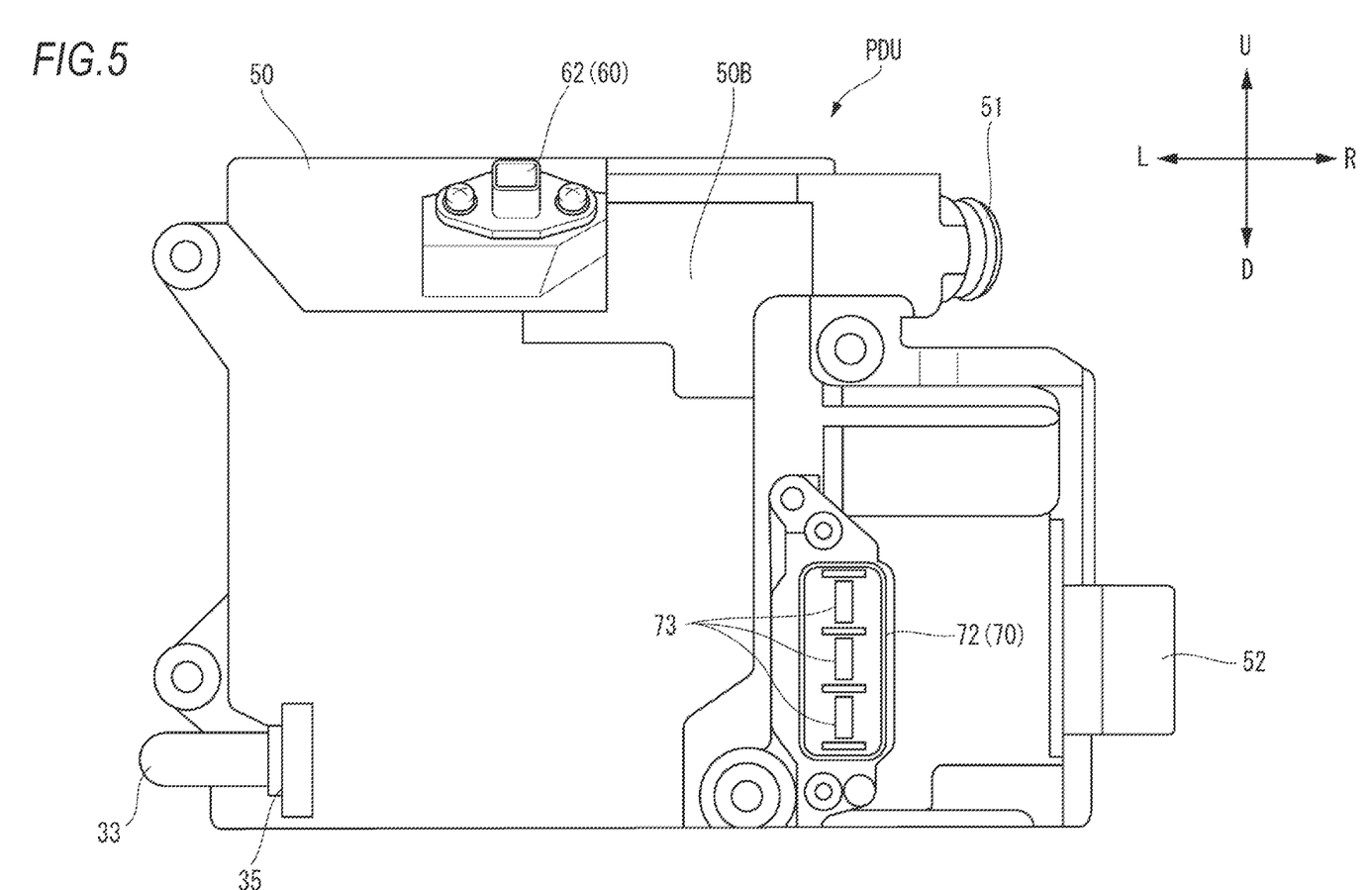
FIG. 5 is a rear view of the electric power conversion device of the driving unit of FIG. 3.

As illustrated in FIGS. 4 and 5, the driving unit 30 includes an electric motor connecting portion 70 which electrically connects the electric motor MOT and the electric power conversion device PDU. Electrically connecting the electric motor MOT and the electric power conversion device PDU means that the electric motor MOT and the electric power conversion device PDU are connected such that electric power is exchangeable therebetween. The electric motor connecting portion 70 has three coil lead wires 71 of U phase, V phase, and W phase extending from the electric motor MOT and an electric power conversion device-side electric power connector 72 protruding from the rear surface 50B of the electric power conversion device case 50 into the electric motor accommodating portion 41 of the electric motor case 40. The electric power conversion device-side electric power connector 72 is provided with terminal portions 73 of three bus bars connected to the substrate of the electric power conversion device PDU, and the three coil lead wires 71 are connected to the terminal portions 73 of the three bus bars.

As a result, the direct current electric power from the battery BAT is converted into alternating current electric power by the electric power conversion device PDU and supplied to the electric motor MOT during the power driving of the electric motor MOT. The alternating current electric power from the electric motor MOT is converted into direct current electric power by the electric power conversion device PDU and supplied to the battery BAT during the regenerative driving of the electric motor MOT.

As illustrated in FIG. 4, the electric motor connecting portion 70 is disposed below the rotation axis CL and between the electric motor MOT and the electric power conversion device PDU in the front-rear direction of the vehicle 1. As a result, the space between the electric motor MOT and the electric power conversion device PDU can be effectively used in the driving unit 30 and the driving unit 30 can be reduced in size. More specifically, the electric motor MOT has a substantially cylindrical shape, the electric power conversion device PDU has a substantially rectangular parallelepiped shape, and thus a space S1 is formed between a lower front-side cylindrical surface 401 extending from a front end portion 400F of the electric motor MOT to a lower end portion 400D and the rear surface 50B of the electric power conversion device case 50 even with the front end portion 400F of the electric motor MOT as close as possible to the electric power conversion device PDU side when viewed from the rotation axis direction. By disposing the electric motor connecting portion 70 in the space S1, the space S1 can be effectively used and the electric motor MOT can be disposed closer to the electric power conversion device PDU side. As a result, the dimension of the driving unit 30 in the front-rear direction can be reduced without increasing the dimension of the driving unit 30 in the up-down direction.

Lubricating oil LB is stored below the electric motor accommodating portion 41 of the electric motor case 40. At least a part of the coil lead wire 71 and the electric power conversion device-side electric power connector 72 of the electric motor connecting portion 70 is immersed in the lubricating oil LB stored below the electric motor accommodating portion 41. As a result, the electric motor connecting portion 70 can be cooled by the lubricating oil LB.

As illustrated in FIG. 5, the electric motor connecting portion 70 is disposed to the right of the middle of the electric power conversion device PDU in the left-right direction.

Figure 6:
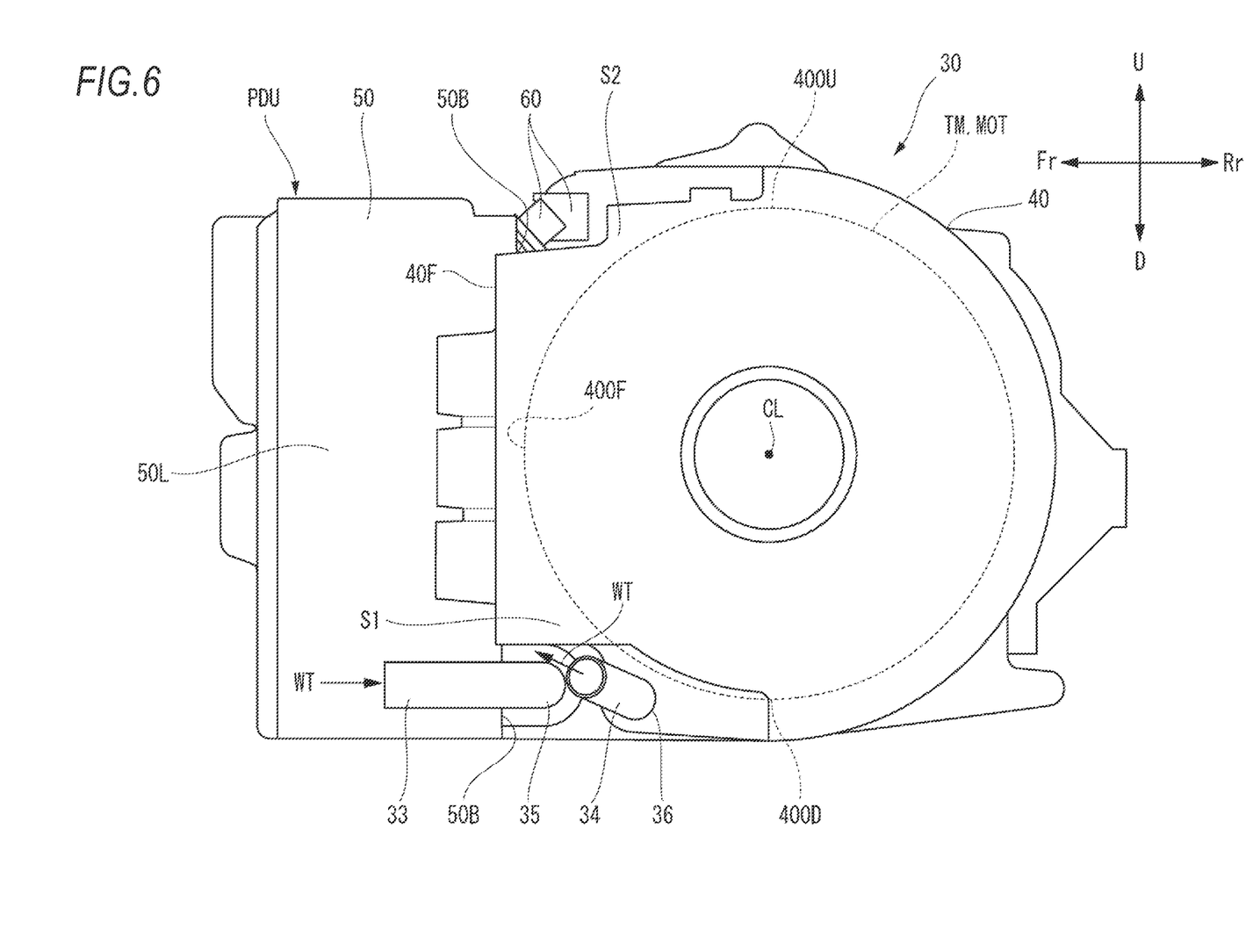
FIG. 6 is a view in which the driving unit of FIG. 3 is viewed from the left side.

As illustrated in FIGS. 3 and 6, the driving unit 30 includes a sensor connecting portion 60 which electrically connects a sensor provided to the electric motor MOT and the electric power conversion device PDU. Electrically connecting the sensor and the electric power conversion device PDU means that the sensor and the electric power conversion device PDU are connected such that a signal from the sensor can be input to the electric power conversion device PDU. The sensor connecting portion 60 has an electric motor-side sensor connector 61 provided to the electric motor case 40, a device-side sensor connector 62 provided to the electric power conversion device case 50, and a signal line 63 electrically connecting the electric motor-side sensor connector 61 and the device-side sensor connector 62. The electric motor-side sensor connector 61 is electrically connected to the sensor (not illustrated) provided to the electric motor MOT. The sensor is not particularly limited insofar as the sensor is capable of detecting the state of the electric motor MOT. The sensor is, for example, a resolver detecting the rotational state of the electric motor MOT or a thermistor detecting the temperature of the electric motor MOT.

The sensor connecting portion 60 is disposed above the rotation axis CL and between the electric motor MOT and the electric power conversion device PDU in the front-rear direction of the vehicle 1. As a result, the space between the electric motor MOT and the electric power conversion device PDU can be effectively used in the driving unit 30 and the driving unit 30 can be reduced in size. More specifically, the electric motor MOT has a substantially cylindrical shape, the electric power conversion device PDU has a substantially rectangular parallelepiped shape, and thus a space S2 is formed between an upper front-side cylindrical surface 402 extending from the front end portion 400F of the electric motor MOT to an upper end portion 400U and the rear surface 50B of the electric power conversion device case 50 even with the front end portion 400F of the electric motor MOT as close as possible to the electric power conversion device PDU side when viewed from the rotation axis direction. By disposing the sensor connecting portion 60 in the space S2, the space S2 can be effectively used and the electric motor MOT can be disposed closer to the electric power conversion device PDU side. As a result, the dimension of the driving unit 30 in the front-rear direction can be reduced without increasing the dimension of the driving unit 30 in the up-down direction.

The sensor connecting portion 60 may be disposed at any position in the left-right direction. In the present embodiment, the electric motor-side sensor connector 61 is disposed near the middle of the electric motor case 40 and the device-side sensor connector 62 is disposed near the middle of the electric power conversion device case 50 in the left-right direction. It is preferable that the electric motor-side sensor connector 61 and the device-side sensor connector 62 are disposed close to each other. As a result, the signal line 63 can be shortened.

Figure 7:
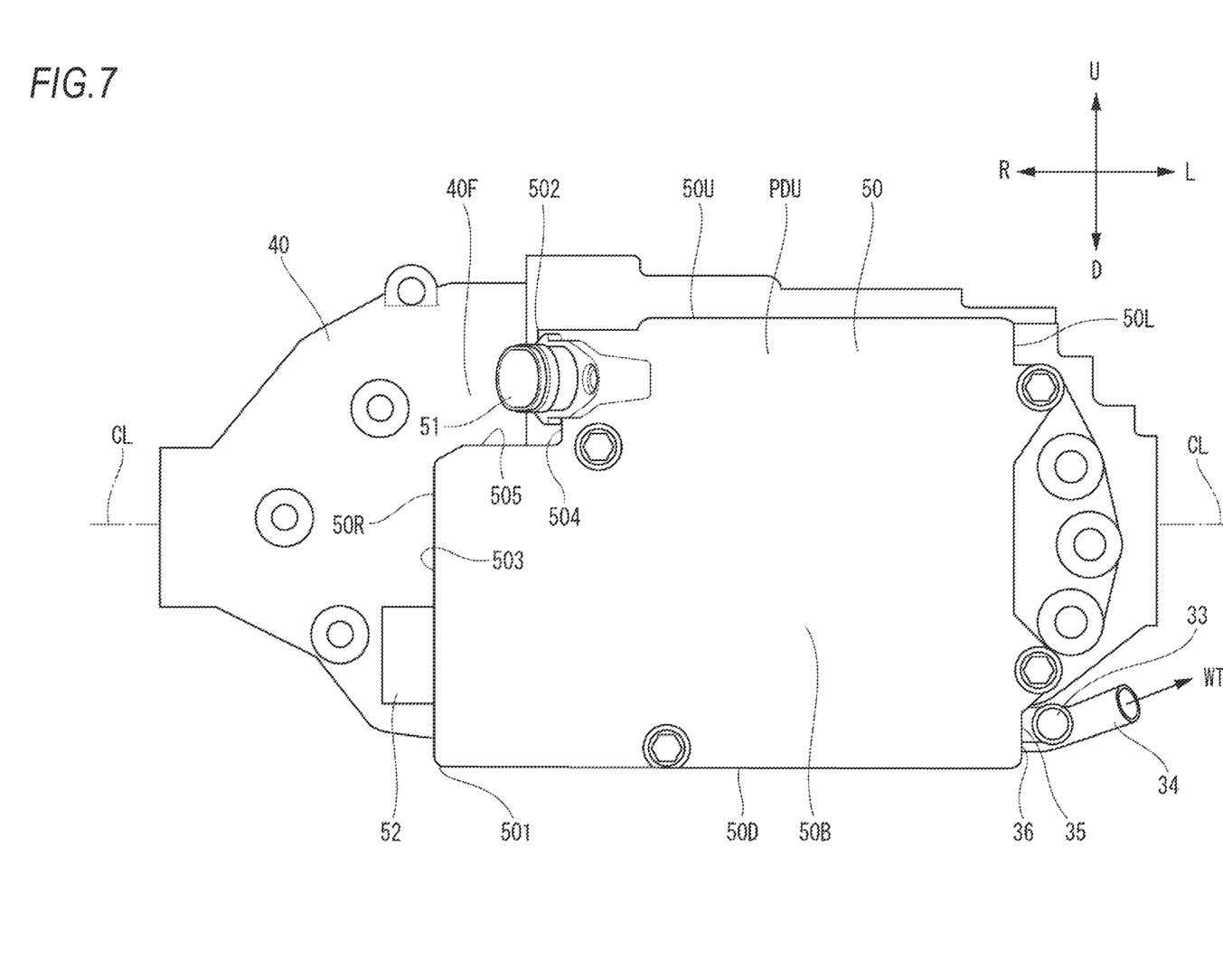
FIG. 7 is a front view of the driving unit of FIG. 3.

As illustrated in FIGS. 6 and 7, a cooling water introduction pipe 33 and a cooling water discharge pipe 34 are connected to the left side of the driving unit 30 in the left-right direction. Cooling water WT is introduced into the driving unit 30 from the cooling water introduction pipe 33. The cooling water WT introduced from the cooling water introduction pipe 33 circulates in the driving unit 30 and is discharged from the cooling water discharge pipe 34 to the outside of the driving unit 30. As a result, the driving unit 30 is cooled by the cooling water WT.

The cooling water introduction pipe 33 and the cooling water discharge pipe 34 are connected to a cooling water introduction pipe connecting portion 35 and a cooling water discharge pipe connecting portion 36 of the driving unit 30.

Both the cooling water introduction pipe connecting portion 35 and the cooling water discharge pipe connecting portion 36 are disposed on the left side of the driving unit 30. Since the cooling water introduction pipe connecting portion 35 and the cooling water discharge pipe connecting portion 36 are disposed on the same side in the vehicle width direction of the driving unit 30, the cooling water introduction pipe 33 and the cooling water discharge pipe 34 can be easily connected when the cooling water introduction pipe 33 and the cooling water discharge pipe 34 are connected to the driving unit 30. In addition, since the cooling water introduction pipe connecting portion 35 and the cooling water discharge pipe connecting portion 36 are provided on the side opposite to the electric motor connecting portion 70 in the rotation axis direction (left-right direction), even in a case where the cooling water WT leaks from the cooling water introduction pipe 33 or the cooling water discharge pipe 34, it is possible to prevent the electric motor connecting portion 70 from being exposed to the cooling water WT.

As illustrated in FIG. 6, the cooling water introduction pipe connecting portion 35 and the cooling water discharge pipe connecting portion 36 are disposed below the rotation axis CL and between the electric motor MOT and the electric power conversion device PDU in the front-rear direction of the vehicle 1. As a result, the space between the electric motor MOT and the electric power conversion device PDU can be effectively used in the driving unit 30 and the driving unit 30 can be reduced in size. More specifically, the electric motor MOT has a substantially cylindrical shape, the electric power conversion device PDU has a substantially rectangular parallelepiped shape, and thus the space S1 is formed between the lower front-side cylindrical surface 401 extending from the front end portion 400F of the electric motor MOT to the lower end portion 400D and the rear surface 50B of the electric power conversion device case 50 even with the front end portion 400F of the electric motor MOT as close as possible to the electric power conversion device PDU side when viewed from the rotation axis direction. By disposing the cooling water introduction pipe connecting portion 35 and the cooling water discharge pipe connecting portion 36 in the space S1, the space S1 can be effectively used and the electric motor MOT can be disposed closer to the electric power conversion device PDU side. As a result, the dimension of the driving unit 30 in the front-rear direction can be reduced without increasing the dimension of the driving unit 30 in the up-down direction.

In addition, the cooling water introduction pipe connecting portion 35 and the cooling water discharge pipe connecting portion are provided below the rotation axis CL in the up-down direction. Thus the traveling wind, which flows below the vehicle 1 during the traveling of the vehicle 1, easily hits the cooling water introduction pipe 33, and the cooling water discharge pipe 34 and the cooling water WT can be further cooled. Further, even in a case where the cooling water WT leaks from the cooling water introduction pipe 33 or the cooling water discharge pipe 34, it is possible to prevent the sensor connecting portion 60 provided above the rotation axis CL from being exposed to the cooling water WT.

The cooling water introduction pipe connecting portion 35 and the cooling water discharge pipe connecting portion 36 are disposed side by side in the front-rear direction of the vehicle 1 such that the cooling water introduction pipe connecting portion 35 is in front of the cooling water discharge pipe connecting portion 36. Further, the cooling water introduction pipe connecting portion 35 and the cooling water discharge pipe connecting portion 36 are disposed so as to overlap at least in part in the up-down direction.

Since the cooling water introduction pipe connecting portion 35 and the cooling water discharge pipe connecting portion 36 are disposed side by side in the front-rear direction of the vehicle 1, the cooling water introduction pipe 33 and the cooling water discharge pipe 34 can be more easily connected to the driving unit 30. In addition, since the cooling water introduction pipe connecting portion 35 is positioned in front of the cooling water discharge pipe connecting portion 36 in the vehicle 1, the traveling wind during the traveling of the vehicle 1 more easily hits the cooling water introduction pipe 33 and the cooling water WT introduced into the driving unit 30 can be further cooled. Further, the dimension of the driving unit 30 in the up-down direction can be reduced since the cooling water introduction pipe connecting portion 35 and the cooling water discharge pipe connecting portion 36 are disposed so as to overlap at least in part in the up-down direction.

In the present embodiment, the cooling water introduction pipe connecting portion 35 is provided to the electric power conversion device case 50 of the driving unit 30 (see FIG. 5) and the cooling water discharge pipe connecting portion 36 is provided to the electric motor case 40 of the driving unit 30. As a result, it is easy to form the cooling water flow path where the cooling water WT introduced from the cooling water introduction pipe 33 circulates in the driving unit 30 such that the cooling water WT flows through the rotary electric machine MOT and the power transmission mechanism TM after flowing through the electric power conversion device PDU. When the cooling water WT flows through the rotary electric machine MOT and the power transmission mechanism TM after flowing through the electric power conversion device PDU, the low-temperature cooling water WT just introduced from the cooling water introduction pipe 33 can be supplied first to the electric power conversion device PDU, which requires a temperature lower than the temperature required by the rotary electric machine MOT and the power transmission mechanism TM, in the driving unit 30. As a result, the driving unit 30 can be cooled more efficiently.

As illustrated in FIG. 7, the cooling water introduction pipe connecting portion 35 and the cooling water discharge pipe connecting portion 36 are provided above the lower end portion of the electric motor case 40 such that the cooling water introduction pipe 33 and the cooling water discharge pipe 34 are connected from the rotation axis direction (vehicle width direction) of the electric motor case 40. Accordingly, the cooling water introduction pipe 33 and the cooling water discharge pipe 34 extend in the vehicle width direction from the driving unit 30 in the cooling water introduction pipe connecting portion 35 and the cooling water discharge pipe connecting portion 36. Since the cooling water introduction pipe 33 and the cooling water discharge pipe 34 extend in the vehicle width direction of the driving unit 30, the cooling water introduction pipe 33 and the cooling water discharge pipe 34 have a large area exposed to the traveling wind when the vehicle 1 travels, and the cooling water WT flowing through the cooling water introduction pipe 33 and the cooling water discharge pipe can be cooled. As a result, the cooling water WT which is further cooled is introduced into the driving unit 30 and the cooling performance of the driving unit 30 is improved. In addition, since the cooling water introduction pipe connecting portion 35 and the cooling water discharge pipe connecting portion 36 are provided above the lower end portion of the driving unit 30, it is possible to prevent the cooling water introduction pipe connecting portion 35 and the cooling water discharge pipe connecting portion 36 or the cooling water introduction pipe 33 and the cooling water discharge pipe 34 from being damaged by an obstacle or the like below the vehicle 1. Further, the electric power conversion device case 50 is disposed so as to protrude below the cooling water introduction pipe 33 and the cooling water discharge pipe 34. As a result, even in a case where the cooling water WT leaks from the cooling water introduction pipe 33 or the cooling water discharge pipe 34, the electric power conversion device case 50 functions as a protective wall and it is possible to further prevent the electric motor connecting portion 70, the DC connector 51, and the low-voltage connector 52 provided on the right side, which is opposite to the cooling water introduction pipe 33 or the cooling water discharge pipe 34, from being exposed to the cooling water WT in the rotation axis direction (left-right direction).

In addition, when viewed from the front, the cooling water introduction pipe 33 and the cooling water discharge pipe 34 are more exposed in the vehicle width direction than the electric power conversion device PDU. As a result, the traveling wind which flows from the front to the rear during the traveling of the vehicle 1 more easily hits the cooling water introduction pipe 33 and the cooling water discharge pipe 34 and the cooling water WT can be further cooled.

As for the electric power conversion device case 50 of the electric power conversion device PDU which is viewed from the front-rear direction, an upper right end portion 502 is positioned to the left of a lower right end portion 501 in the left-right direction. The right side surface 50R of the electric power conversion device case 50 is provided with a lower right side surface 503 extending upward from the lower right end portion 501 of the electric power conversion device case 50, an upper right side surface 504 extending downward from the upper right end portion 502 of the electric power conversion device case 50 and positioned to the left of the lower right side surface 503 in the left-right direction, and a step surface 505 connecting the upper end portion of the lower right side surface 503 and the lower end portion of the upper right side surface 504 in the left-right direction.

The DC connector 51 is disposed on the upper right side surface 504, and the low-voltage connector 52 is disposed on the lower right side surface 503.

The DC connector 51 is positioned above the rotation axis CL and below the upper surface of the electric power conversion device PDU in the up-down direction and to the left of the lower right side surface 503 in the left-right direction. Since the DC connector 51 is positioned above the rotation axis CL, it is possible to prevent the DC connector 51 from being damaged or causing electric leakage even in a case where foreign matter enters from below the vehicle 1. In addition, since the DC connector 51 is positioned below the upper surface of the electric power conversion device PDU and to the left of the lower right side surface 503 in the left-right direction, it is possible to prevent the DC connector 51 from being exposed outside the electric power conversion device PDU in the up-down direction and the left-right direction (rotation axis direction). Further, since the DC connector 51 is positioned to the left of the lower right side surface 503 in the left-right direction, the lower right side surface 503 can be visually recognized with ease from above the driving unit 30 (see FIG. 8). Since the low-voltage connector 52 is disposed on the lower right side surface 503, which can be visually recognized with ease from above the driving unit 30, excellence in maintainability is achieved while the space of the lower right side surface 503 of the electric power conversion device PDU is effectively used.

Figure 8:
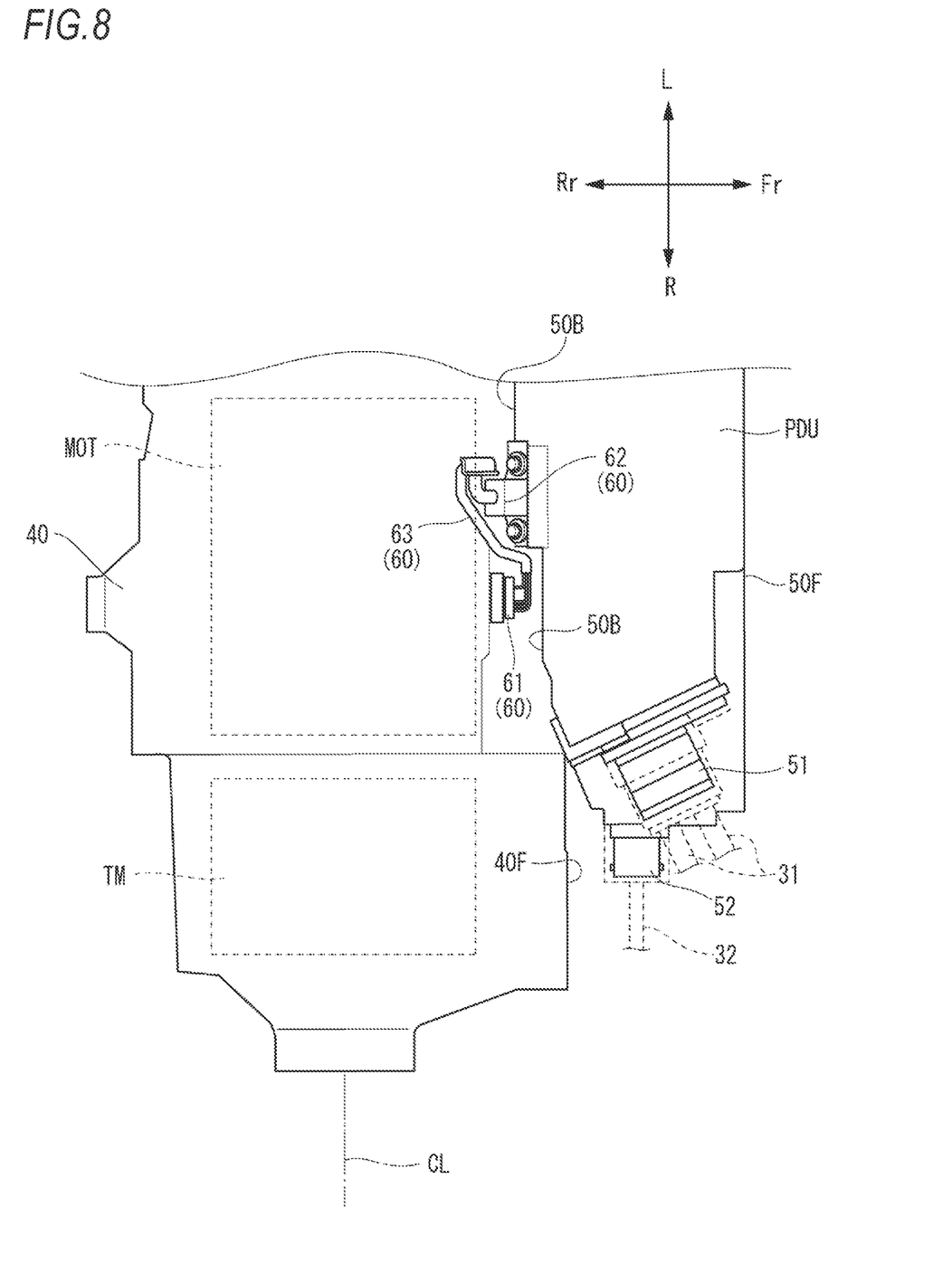
FIG. 8 is an enlarged view of a main part in which the driving unit of FIG. 3 is viewed from above.

As illustrated in FIG. 8, the DC connector 51 disposed on the upper right side surface 504 is disposed so as to protrude diagonally forward to the right from the electric power conversion device PDU when viewed from above. In other words, the DC connector 51 is disposed so as to be inclined at a predetermined angle in a direction away from the electric motor MOT in the front-rear direction and protrude from the electric power conversion device PDU toward the direction away from the electric power conversion device PDU in the left-right direction (rotation axis direction). As a result, a large space can be taken between the tip of the DC connector 51 and the electric motor case 40 in the front-rear direction when the DC line 31 is connected to the DC connector 51, and thus a work space is ensured with ease and maintainability is improved.

In addition, the DC connector 51 is disposed behind the front-side end portion of the electric power conversion device PDU in the front-rear direction, that is, on the electric motor MOT side. As a result, it is possible to prevent the DC connector 51 from being exposed outside the electric power conversion device PDU in the front-rear direction.

The low-voltage connector 52 disposed on the lower right side surface 503 is disposed so as to protrude to the right from the electric power conversion device PDU when viewed from above. In other words, the low-voltage connector 52 is disposed so as to protrude in the left-right direction (rotation axis direction) from the electric power conversion device PDU.

Accordingly, when viewed from above, the low-voltage connector 52 is disposed so as to protrude to the right from the electric power conversion device PDU whereas the DC connector 51 is disposed so as to protrude diagonally forward to the right from the electric power conversion device PDU, and thus the DC line 31 connected to the DC connector 51 and the low-voltage line 32 connected to the low-voltage connector 52 can be disposed so as to be misaligned in the front-rear direction and it is possible to prevent the positions of the DC line 31 and the low-voltage line 32 from interfering with each other.

Although various embodiments have been described above with reference to the drawings, it is a matter of course that the present invention is not limited to such examples. It is clear that those skilled in the art can devise various changes or modifications within the scope of the claims, which naturally and understandably belong to the technical scope of the present invention. In addition, each component in the above-described embodiments may be freely combined within the scope of the invention.

For example, although a hybrid vehicle having the engine ENG and the electric motor MOT as its driving source is exemplified in the above embodiment, the vehicle may be an electric vehicle having only the electric motor MOT as its driving source.

In the above embodiment, the driving unit 30 accommodating the electric motor MOT is disposed in the rear portion of the vehicle 1. Alternatively, the electric motor MOT may be used as a driving source driving the left and right front wheels FW with the driving unit 30 disposed in the front room 6. In this case, it is preferable that the electric power conversion device PDU is disposed so as to be positioned between the electric motor MOT and the passenger compartment 4 in the front-rear direction, that is, such that the electric power conversion device PDU faces rearward.

In the above embodiment, the driving unit 30 has the electric motor case 40 and the electric power conversion device case 50. Alternatively, the electric motor case 40 and the electric power conversion device case 50 may be one integrally-molded case. In other words, the electric motor MOT and the electric power conversion device PDU may be accommodated in one case.

As for the driving unit 30 in the above embodiment, the cooling water WT is introduced from the cooling water introduction pipe 33, circulates in the driving unit 30, and is discharged from the cooling water discharge pipe 34 to the outside of the driving unit 30. Any coolant not limited to the cooling water WT may be introduced and circulate in the driving unit 30.

At least the following matters are described in this specification. Although components or the like corresponding to the embodiment described above are in the parentheses, the present invention is not limited thereto.

(1) A driving unit (driving unit 30) including:
- a rotary electric machine (electric motor MOT) which has a rotation axis (rotation axis CL) extending in a horizontal direction;
- a rotary electric machine case (electric motor case 40) which has a rotary electric machine accommodating portion (electric motor accommodating portion 41) accommodating the rotary electric machine; and
- an electric power conversion device (electric power conversion device PDU) which is electrically connected to the rotary electric machine and converts electric power supplied to the rotary electric machine and electric power supplied from the rotary electric machine, in which:
- the electric power conversion device is disposed on one side of the rotary electric machine in an orthogonal direction (front-rear direction) orthogonal to both a rotation axis direction and an up-down direction;
- a first connecting portion (electric motor connecting portion 70) electrically connecting the rotary electric machine and the electric power conversion device is disposed below the rotation axis when viewed from the rotation axis direction;
- a second connecting portion (sensor connecting portion 60) electrically connecting a sensor provided to the rotary electric machine and the electric power conversion device is disposed above the rotation axis when viewed from the rotation axis direction; and
- the first connecting portion and the second connecting portion are disposed between the rotary electric machine and the electric power conversion device in the orthogonal direction when viewed from the rotation axis direction.

According to (1), the first connecting portion and the second connecting portion are disposed between the rotary electric machine and the electric power conversion device in the orthogonal direction when viewed from the rotation axis direction. As a result, the space between the rotary electric machine and the electric power conversion device can be effectively used and the driving unit can be reduced in size.

(2) The driving unit according to (1), in which:
- a first coolant (lubricating oil LB) is stored in the rotary electric machine accommodating portion of the rotary electric machine case; and
- at least a part of the first connecting portion is immersed in the first coolant.

According to (2), at least a part of the first connecting portion is immersed in the first coolant stored in the rotary electric machine accommodating portion of the rotary electric machine case. As a result, the first connecting portion can be cooled by the first coolant.

(3) The driving unit according to (1) or (2), in which:
- the first connecting portion is disposed closer to a first end portion side (right side) in the rotation axis direction than a middle of the electric power conversion device;
- a coolant introduction pipe (cooling water introduction pipe 33) introducing a second coolant (cooling water WT) into the driving unit and a coolant discharge pipe (cooling water discharge pipe 34) discharging the second coolant from the driving unit are connected to the driving unit; and
- a coolant introduction pipe connecting portion (cooling water introduction pipe connecting portion 35) where the coolant introduction pipe is connected and a coolant discharge pipe connecting portion (cooling water discharge pipe connecting portion 36) where the coolant discharge pipe is connected are disposed on a second end portion side (left side) in the rotation axis direction and between the rotary electric machine and the electric power conversion device in the orthogonal direction.

According to (3), the coolant introduction pipe connecting portion and the coolant discharge pipe connecting portion are disposed between the rotary electric machine and the electric power conversion device in the orthogonal direction. As a result, the space between the rotary electric machine and the electric power conversion device can be effectively used and the driving unit can be reduced in size.

Further, the coolant introduction pipe connecting portion and the coolant discharge pipe connecting portion are provided on the side opposite to the first connecting portion in the rotation axis direction. As a result, it is possible to prevent the first connecting portion from being exposed to the second coolant even in a case where the second coolant leaks from the coolant introduction pipe or the coolant discharge pipe.

(4) The driving unit according to (3), in which:
- the second connecting portion is disposed on the second end portion side in the rotation axis direction; and
- the coolant introduction pipe connecting portion and the coolant discharge pipe connecting portion are disposed below the rotation axis.

According to (4), the second connecting portion is disposed above the rotation axis and the coolant introduction pipe connecting portion and the coolant discharge pipe connecting portion are disposed below the rotation axis on the second end portion side in the rotation axis direction. As a result, it is possible to prevent the second connecting portion from being exposed to the second coolant even in a case where the second coolant leaks from the coolant introduction pipe or the coolant discharge pipe.

(5) A driving unit (driving unit 30) including:
- a rotary electric machine (electric motor MOT) which has a rotation axis (rotation axis CL) extending in a horizontal direction;

a rotary electric machine case (electric motor case 40) which has a rotary electric machine accommodating portion (electric motor accommodating portion 41) accommodating the rotary electric machine; and an electric power conversion device (electric power conversion device PDU) which is electrically connected to the rotary electric machine and converts electric power supplied to the rotary electric machine and electric power supplied from the rotary electric machine, in which:

the electric power conversion device is disposed on one side of the rotary electric machine in an orthogonal direction (front-rear direction) orthogonal to both a rotation axis direction and an up-down direction;

a first coolant (lubricating oil LB) is stored in the rotary electric machine accommodating portion of the rotary electric machine case;

a coolant introduction pipe (cooling water introduction pipe 33) introducing a second coolant (cooling water WT) into the driving unit and a coolant discharge pipe (cooling water discharge pipe 34) discharging the second coolant from the driving unit are connected to the driving unit;

a first connecting portion (electric motor connecting portion 70) electrically connecting the rotary electric machine and the electric power conversion device is disposed below the rotation axis on a first end portion side (right side) in the rotation axis direction, at least a part of the first connecting portion being immersed in the first coolant;

a coolant introduction pipe connecting portion (cooling water introduction pipe connecting portion 35) where the coolant introduction pipe is connected and a coolant discharge pipe connecting portion (cooling water discharge pipe connecting portion 36) where the coolant discharge pipe is connected are disposed below the rotation axis on a second end portion side (left side) in the rotation axis direction; and the first connecting portion, the coolant introduction pipe connecting portion, and the coolant discharge pipe connecting portion are disposed between the rotary electric machine and the electric power conversion device in the orthogonal direction.

According to (5), the first connecting portion, the coolant introduction pipe connecting portion, and the coolant discharge pipe connecting portion are disposed between the rotary electric machine and the electric power conversion device in the orthogonal direction. As a result, the space between the rotary electric machine and the electric power conversion device can be effectively used and the driving unit can be reduced in size.

In addition, at least a part of the first connecting portion is immersed in the first coolant stored in the rotary electric machine accommodating portion of the rotary electric machine case. As a result, the first connecting portion can be cooled by the first coolant.

In addition, the first connecting portion is provided on the side opposite to the coolant introduction pipe connecting portion and the coolant discharge pipe connecting portion in the rotation axis direction. As a result, it is possible to prevent the first connecting portion from being exposed to the second coolant even in a case where the coolant leaks from the coolant introduction pipe or the coolant discharge pipe.

(6) The driving unit according to any one of (3) to (5), in which:

the coolant introduction pipe connecting portion and the coolant discharge pipe connecting portion are provided above a lower end portion of the rotary electric machine case such that the coolant introduction pipe and the coolant discharge pipe are connected from the rotation axis direction.

According to (6), the coolant introduction pipe and the coolant discharge pipe are connected to the driving unit from the rotation axis direction of the rotary electric machine case. As a result, it is possible to further prevent the first connecting portion from being exposed to the second coolant even in a case where the coolant leaks from the coolant introduction pipe or the coolant discharge pipe.

(7) The driving unit according to any one of (3) to (6), in which:

the electric power conversion device has a first connector (DC connector 51) where a first electric power line (DC line 31), where electric power supplied to the rotary electric machine and electric power supplied from the rotary electric machine flow, is connected; and the first connector is provided on the first end portion side in the rotation axis direction.

According to (7), the first connector where the first electric power line, where electric power supplied to the rotary electric machine and electric power supplied from the rotary electric machine flow, is connected is provided on the first end portion side in the rotation axis direction, that is, on the side opposite to the coolant introduction pipe connecting portion and the coolant discharge pipe connecting portion in the rotation axis direction. As a result, it is possible to prevent the first connector from being exposed to the second coolant even in a case where the coolant leaks from the coolant introduction pipe or the coolant discharge pipe.

(8) The driving unit according to (7), in which
the first connector is positioned above the rotation axis and below an upper surface (upper surface 50U) of the electric power conversion device.

According to (8), the first connector is positioned above the rotation axis. As a result, it is possible to prevent the first connector from being damaged or causing electric leakage even in a case where foreign matter enters from below. In addition, the first connector is disposed below the upper surface of the electric power conversion device. As a result, it is possible to prevent the first connector from being exposed above the electric power conversion device.

(9) The driving unit according to (7) or (8), in which
the first connector is disposed closer to the rotary electric machine side in the orthogonal direction than an end portion (front surface 50F) of the electric power conversion device on a side opposite to the rotary electric machine case.

According to (9), the first connector is disposed closer to the rotary electric machine side in the orthogonal direction than the end portion of the electric power conversion device on the side opposite to the rotary electric machine case. As a result, it is possible to prevent the first connector from being exposed outside the electric power conversion device in the orthogonal direction.

(10) The driving unit according to any one of (7) to (9), in which
when viewed from the orthogonal direction:
a lower side surface (lower right side surface 503), an upper side surface (upper right side surface 504), and a step surface (step surface 505) are provided on the first end portion side of the electric power conversion device, the upper side surface being positioned closer to the second end portion side than the lower side surface in the rotation axis direction, the step surface connecting an upper end portion of the lower side surface and a lower end portion of the upper side surface in the rotation axis direction, and the first connector is disposed on the upper side surface and positioned closer to the second end portion side than the lower side surface in the rotation axis direction.

According to (10), the first connector is disposed on the upper side surface positioned closer to the second end portion side than the lower side surface in the rotation axis direction and positioned closer to the second end portion side than the lower side surface in the rotation axis direction. As a result, it is possible to prevent the first connector from being exposed outside the electric power conversion device in the rotation axis direction. Further, the lower side surface can be visually recognized with ease from above the driving unit.

(11) The driving unit according to (10), in which
the first connector is disposed to be inclined at a predetermined angle in a direction away from the rotary electric machine in the orthogonal direction and protrude from the electric power conversion device toward a direction away from the upper side surface in the rotation axis direction when viewed from above.

According to (11), the first connector is disposed so as to be inclined at a predetermined angle in a direction away from the rotary electric machine in the orthogonal direction and protrude from the electric power conversion device toward a direction away from the upper side surface in the rotation axis direction when viewed from above. As a result, a work space is ensured with ease and maintainability is improved.

(12) The driving unit according to (9) or (10), in which:
the electric power conversion device has a second connector (low-voltage connector 52) where a second electric power line (low-voltage line 32) supplying electric power to the electric power conversion device is connected; and
the second connector is disposed on the lower side surface.

According to (12), the second connector is disposed on the lower side surface, which can be visually recognized with ease from above the driving unit. As a result, excellence in maintainability is achieved while the space of the lower side surface of the electric power conversion device is effectively used.

(13) The driving unit according to (12), in which
the second connector is disposed to protrude in the rotation axis direction from the electric power conversion device when viewed from above.

According to (13), when viewed from above, the second connector is disposed to protrude from the electric power conversion device in the rotation axis direction whereas the first connector is disposed to be inclined at a predetermined angle in a direction away from the rotary electric machine in the orthogonal direction and protrude from the electric power conversion device toward a direction away from the upper side surface in the rotation axis direction. As a result, the first electric power line connected to the first connector and the second electric power line connected to the second connector can be disposed so as to be misaligned in the orthogonal direction and it is possible to prevent the positions of the first electric power line and the second electric power line from interfering with each other.

(14) A vehicle (vehicle 1) equipped with the driving unit according to any one of (1) to (13), in which:
the driving unit is disposed in front of or behind a passenger compartment (passenger compartment 4) such that the rotation axis extends in a vehicle width direction; and
the electric power conversion device is positioned between the rotary electric machine and the passenger compartment.

According to (14), the driving unit is disposed in front of or behind the passenger compartment such that the rotation axis extends in the vehicle width direction and the electric power conversion device is positioned between the rotary electric machine and the passenger compartment. As a result, it is possible to prevent the impact caused by a front or rear collision from being directly input to the electric power conversion device.

REFERENCE SIGNS LIST

1: vehicle
4: passenger compartment
30: driving unit
31: DC line (first electric power line)
32: low-voltage line (second electric power line)
33: cooling water introduction pipe (coolant introduction pipe)
34: cooling water discharge pipe (coolant discharge pipe)
35: cooling water introduction pipe connecting portion (coolant introduction pipe connecting portion)
36: cooling water discharge pipe connecting portion (coolant discharge pipe connecting portion)
40: electric motor case (rotary electric machine case)
41: electric motor accommodating portion (rotary electric machine accommodating portion)
50U: upper surface
50F: front surface
51: DC connector (first connector)
52: low-voltage connector (second connector)
60: sensor connecting portion (second connecting portion)
70: electric motor connecting portion (first connecting portion)
503: lower right side surface (lower side surface)
504: upper right side surface (upper side surface)
505: step surface
MOT: electric motor (rotary electric machine)
PDU: electric power conversion device
CL: rotation axis
LB: lubricating oil (first coolant)
WT: cooling water (second coolant)

The invention claimed is:
1. A driving unit comprising:
a rotary electric machine which has a rotation axis extending in a horizontal direction;
a rotary electric machine case which has a rotary electric machine accommodating portion accommodating the rotary electric machine; and
an electric power conversion device which is electrically connected to the rotary electric machine and converts electric power supplied to the rotary electric machine and electric power supplied from the rotary electric machine, wherein:
the electric power conversion device is disposed on one side of the rotary electric machine in an orthogonal direction orthogonal to both a rotation axis direction and an up-down direction;

a first coolant is stored in the rotary electric machine accommodating portion of the rotary electric machine case;
a coolant introduction pipe introducing a second coolant into the driving unit and a coolant discharge pipe discharging the second coolant from the driving unit are connected to the driving unit;
a first connecting portion electrically connecting the rotary electric machine and the electric power conversion device is disposed below the rotation axis on a first end portion side in the rotation axis direction, at least a part of the first connecting portion being immersed in the first coolant,
a coolant introduction pipe connecting portion where the coolant introduction pipe is connected and a coolant discharge pipe connecting portion where the coolant discharge pipe is connected are disposed below the rotation axis on a second end portion side in the rotation axis direction; and
the first connecting portion, the coolant introduction pipe connecting portion, and the coolant discharge pipe connecting portion are disposed between the rotary electric machine and the electric power conversion device in the orthogonal direction when viewed from the rotation axis direction.

2. A driving unit comprising:
a rotary electric machine which has a rotation axis extending in a horizontal direction;
a rotary electric machine case which has a rotary electric machine accommodating portion accommodating the rotary electric machine; and
an electric power conversion device which is electrically connected to the rotary electric machine and converts electric power supplied to the rotary electric machine and electric power supplied from the rotary electric machine, wherein:
the electric power conversion device is disposed on one side of the rotary electric machine in an orthogonal direction orthogonal to both a rotation axis direction and an up-down direction;
a first connecting portion electrically connecting the rotary electric machine and the electric power conversion device is disposed below the rotation axis when viewed from the rotation axis direction;
a second connecting portion electrically connecting a sensor provided to the rotary electric machine and the electric power conversion device is disposed above the rotation axis;
the first connecting portion and the second connecting portion are disposed between the rotary electric machine and the electric power conversion device in the orthogonal direction when viewed from the rotation axis direction;
the first connecting portion is disposed closer to a first end portion side in the rotation axis direction than a middle of the electric power conversion device;
a coolant introduction pipe introducing a second coolant into the driving unit and a coolant discharge pipe discharging the second coolant from the driving unit are connected to the driving unit; and
a coolant introduction pipe connecting portion where the coolant introduction pipe is connected and a coolant discharge pipe connecting portion where the coolant discharge pipe is connected are disposed on a second end portion side in the rotation axis direction and between the rotary electric machine and the electric power conversion device in the orthogonal direction.

3. The driving unit according to claim 2, wherein:
the electric power conversion device has a first connector where a first electric power line, where electric power supplied to the rotary electric machine and electric power supplied from the rotary electric machine flow, is connected; and
the first connector is provided on the first end portion side in the rotation axis direction.

4. The driving unit according to claim 3, wherein the first connector is positioned above the rotation axis and below an upper surface of the electric power conversion device.

5. The driving unit according to claim 3, wherein the first connector is disposed closer to the rotary electric machine side in the orthogonal direction than an end portion of the electric power conversion device on a side opposite to the rotary electric machine case.

6. The driving unit according to claim 3, wherein when viewed from the orthogonal direction:
a lower side surface, an upper side surface, and a step surface are provided on the first end portion side of the electric power conversion device, the upper side surface being positioned closer to the second end portion side than the lower side surface in the rotation axis direction, the step surface connecting an upper end portion of the lower side surface and a lower end portion of the upper side surface in the rotation axis direction; and
the first connector is disposed on the upper side surface and positioned closer to the second end portion side than the lower side surface in the rotation axis direction.

7. The driving unit according to claim 6, wherein the first connector is disposed to be inclined at a predetermined angle in a direction away from the rotary electric machine in the orthogonal direction and protrude from the electric power conversion device toward a direction away from the upper side surface in the rotation axis direction when viewed from above.

8. The driving unit according to claim 6, wherein:
the electric power conversion device has a second connector where a second electric power line supplying electric power to the electric power conversion device is connected; and
the second connector is disposed on the lower side surface.

9. The driving unit according to claim 8, wherein the second connector is disposed to protrude in the rotation axis direction from the electric power conversion device when viewed from above.

10. A vehicle equipped with the driving unit according to claim 2, wherein:
the driving unit is disposed in front of or behind a passenger compartment such that the rotation axis extends in a vehicle width direction; and
the electric power conversion device is positioned between the rotary electric machine and the passenger compartment.

11. The driving unit according to claim 2, wherein:
a first coolant is stored in the rotary electric machine accommodating portion of the rotary electric machine case; and
at least a part of the first connecting portion is immersed in the first coolant.

12. The driving unit according to claim 2, wherein:
the second connecting portion is disposed on the second end portion side in the rotation axis direction; and
the coolant introduction pipe connecting portion and the coolant discharge pipe connecting portion are disposed below the rotation axis.

13. The driving unit according to claim 2, wherein:
the coolant introduction pipe connecting portion and the coolant discharge pipe connecting portion are provided above a lower end portion of the rotary electric machine case such that the coolant introduction pipe and the coolant discharge pipe are connected from the rotation axis direction.

\* \* \* \* \*